US012683903B2

(12) United States Patent
Hikichi et al.

(10) Patent No.: US 12,683,903 B2
(45) Date of Patent: Jul. 14, 2026

(54) MONITORING IMAGE TRANSMISSION APPARATUS FOR ELEVATORS

(71) Applicant: Mitsubishi Electric Corporation, Tokyo (JP)

(72) Inventors: Masaki Hikichi, Tokyo (JP); Kiyotaka Watanabe, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1808 days.

(21) Appl. No.: 16/649,981

(22) PCT Filed: Nov. 13, 2017

(86) PCT No.: PCT/JP2017/040748

§ 371 (c)(1),
(2) Date: Mar. 24, 2020

(87) PCT Pub. No.: WO2019/092883

PCT Pub. Date: May 16, 2019

(65) Prior Publication Data

US 2020/0223659 A1　　Jul. 16, 2020

(51) Int. Cl.
B66B 5/00 (2006.01)
B66B 1/34 (2006.01)
(Continued)

(52) U.S. Cl.
CPC ........ H04L 47/2416 (2013.01); B66B 1/3446 (2013.01); B66B 5/0031 (2013.01);
(Continued)

(58) Field of Classification Search
CPC ......... B66B 1/24; B66B 1/28–30; B66B 1/32; B66B 1/34; B66B 1/3415; B66B 1/3423; B66B 1/3446; B66B 1/3453
See application file for complete search history.

(56) References Cited

U.S. PATENT DOCUMENTS 5,485,897 A  *　1/1996　Matsumoto ............. B66B 3/008
　　　　　　　　　　　　　　　　　　　　187/397
7,823,704 B2 *　11/2010　Amano ................. B66B 5/0012
　　　　　　　　　　　　　　　　　　　　187/247
(Continued)

FOREIGN PATENT DOCUMENTS

JP　　　H04-109974 U　　9/1992
JP　　　2006-056678 A　　3/2006
(Continued)

OTHER PUBLICATIONS

International Search Report and Written Opinion mailed on Feb. 6, 2018 for PCT/JP2017/040748 filed on Nov. 13, 2017, 9 pages including English Translation of the International Search Report.
(Continued)

*Primary Examiner* — Christopher Uhlir
(74) *Attorney, Agent, or Firm* — XSENSUS LLP

(57) ABSTRACT

A monitoring image transmission apparatus for elevators that can reduce network load is provided. A monitoring image transmission apparatus for elevators according to the present invention includes: an event input section (17) configured to receive input of a signal indicating an event occurring in connection with an elevator; an image management section (18) configured to select an image at a specific time point or during a specific time period with respect to a timing at which the signal is received by the event input section (17), in an image shot by a camera installed in at least one of a car or a hall of the elevator, in accordance with an image selection rule; and an image transmission section (20) configured to transmit the image selected by the image management section (18) to an image analysis server (16) over a network (15).

17 Claims, 2 Drawing Sheets

(51) Int. Cl.

| | |
|---|---|
| *B66B 5/02* | (2006.01) |
| *B66B 13/02* | (2006.01) |
| *G06T 1/00* | (2006.01) |
| *G06T 5/90* | (2024.01) |
| *G06T 7/00* | (2017.01) |
| *H04L 47/2416* | (2022.01) |
| *H04N 1/21* | (2006.01) |
| *H04N 7/18* | (2006.01) |

(52) U.S. Cl.

CPC .............. *B66B 5/02* (2013.01); *B66B 5/022* (2013.01); *B66B 13/02* (2013.01); *G06T 1/0007* (2013.01); *G06T 5/90* (2024.01); *G06T 7/0002* (2013.01); *H04N 1/2133* (2013.01); *H04N 7/181* (2013.01); *H04N 7/188* (2013.01); *G06T 2200/16* (2013.01); *G06T 2207/30168* (2013.01)

(56) References Cited

U.S. PATENT DOCUMENTS

| | | | | |
|---|---|---|---|---|
| 10,336,575 | B2 * | 7/2019 | Salmikuukka | .......... B66B 1/468 |
| 10,635,894 | B1 * | 4/2020 | Genner | .................. G06V 40/16 |
| 11,299,371 | B2 * | 4/2022 | Sun | ....................... B66B 5/0062 |
| 11,780,704 | B2 * | 10/2023 | Copeland | .............. B66B 5/0025 187/391 |
| 2005/0013488 | A1 | 1/2005 | Hashimoto et al. | |
| 2021/0171315 | A1 * | 6/2021 | Kattainen | ............. B66B 5/0025 |

FOREIGN PATENT DOCUMENTS

| | | | |
|---|---|---|---|
| JP | 2008-37550 | A | 2/2008 |
| JP | 4127545 | B2 | 7/2008 |
| JP | 2008-189413 | A | 8/2008 |
| JP | 2011-251846 | A | 12/2011 |
| JP | 2012-017193 | A | 1/2012 |
| JP | 2012-96872 | A | 5/2012 |
| JP | 2013-175049 | A | 9/2013 |
| JP | 2014-131932 | A | 7/2014 |
| JP | 2015-151222 | A | 8/2015 |
| JP | 2017-001801 | A | 1/2017 |

OTHER PUBLICATIONS

Office Action issued on Jan. 25, 2021, in corresponding Chinese patent Application No. 201780096701.1, 14 pages.

Office Action issued Nov. 25, 2024 in German Patent Application No. 11 2017 008 097.5, 29 pages.

Wikipedia, The free encyclopedia, Image processing, Sep. 11, 2017, [accessed on Nov. 25, 2024], URL: https://de.wikipedia.org/w/index.php? title=Image processing&oldid=168977020, 16 pages (with English Translation).

Office Action issued on Nov. 30, 2021, in Korean patent Application No. 10-2020-7016857.

* cited by examiner

MONITORING IMAGE TRANSMISSION APPARATUS FOR ELEVATORS

CROSS-REFERENCE TO RELATED APPLICATIONS

The present application is based on PCT filing PCT/JP2017/040748, filed Nov. 13, 2017, the entire contents of which are incorporated herein by reference.

FIELD

The present invention relates to a monitoring image transmission apparatus for elevators.

BACKGROUND

Conventionally, a system has been known that controls elevators based on a result of analyzing an image shot by a monitoring camera installed in each car or at each hall. As such a system, a system described in PTL 1 below can be cited.

CITATION LIST

Patent Literature

[PTL 1] JP 2011-251846 A

SUMMARY

Technical Problem

In a system as described above, for example, image analysis is performed by a server connected to elevator-side devices through a network. In such a case, image data is transmitted to the server, and consequently network load is increased.

The present invention is made to solve the above problem. An object thereof is to provide a monitoring image transmission apparatus for elevators that can reduce the network load.

Solution to Problem

A monitoring image transmission apparatus for elevators according to the present invention includes: an event input section configured to receive input of a signal indicating an event occurring in connection with an elevator; an image management section configured to select an image at a specific time point or during a specific time period with respect to a timing at which the signal is received by the event input section, in an image shot by a camera installed in at least one of a car and a hall of the elevator, in accordance with an image selection rule; and an image transmission section configured to transmit the image selected by the image management section to an image analysis server over a network.

Advantageous Effects of Invention

According to the present invention, an image at a specific time point or during a specific time period in a shot image is transmitted to the image analysis server. Accordingly, the network load can be reduced.

DESCRIPTION OF EMBODIMENTS

An embodiment for carrying out the present invention will be described with reference to the accompanying drawings. In each drawing, same or corresponding parts are denoted by same reference signs. A repeated description will be simplified or omitted as appropriate.

Embodiment 1

Figure 1:
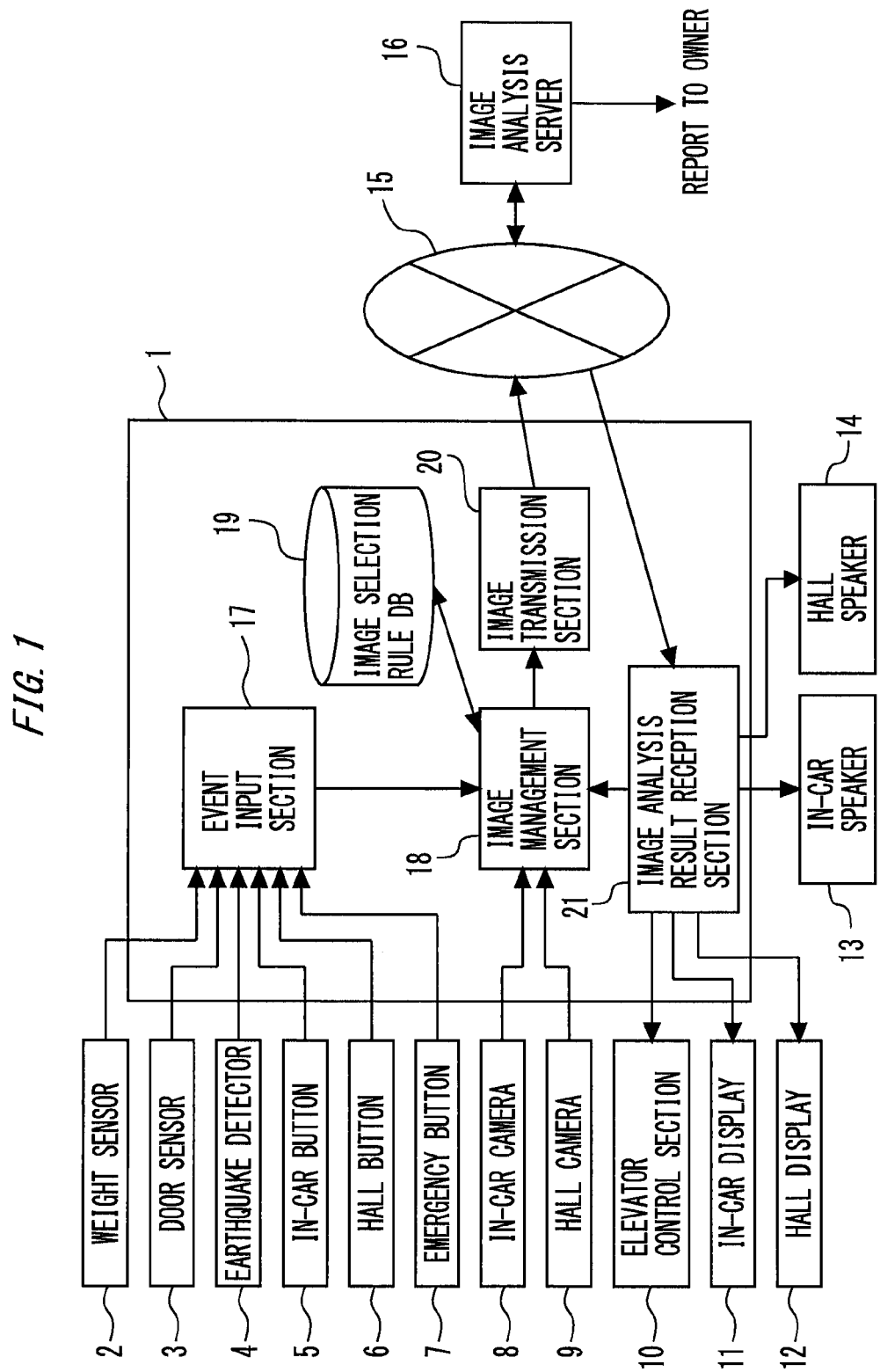
FIG. 1 is a configuration diagram of an image analysis system for elevators in an embodiment 1.

FIG. 1 is a configuration diagram of an image analysis system for elevators in an embodiment 1.

The image analysis system includes a monitoring image transmission apparatus 1. The monitoring image transmission apparatus 1 is installed, for example, in a building where an elevator is installed.

The monitoring image transmission apparatus 1 is electrically connected to various devices installed for the elevator. The monitoring image transmission apparatus 1 is electrically connected to, for example, a weight sensor 2, a door sensor 3, an earthquake detector 4, an in-car button 5, a hall button 6, an emergency button 7, an in-car camera 8, a hall camera 9, an elevator control section 10, an in-car display 11, a hall display 12, an in-car speaker 13, and a hall speaker 14.

The monitoring image transmission apparatus 1 is capable of communicating with an image analysis server 16 over a network 15. The image analysis server 16 is installed, for example, in a different building from the building in which the monitoring image transmission apparatus 1 is installed. For example, the image analysis server 16 may communicate with each of a plurality of monitoring image transmission apparatuses 1 installed in different buildings.

The weight sensor 2 is provided, for example, at an end of a rope or in a car or the like of the elevator. The weight sensor 2 measures a load on the car. For example, the weight sensor 2 outputs a signal indicating a magnitude of the measured load.

The door sensor 3 is, for example, an infrared sensor or the like provided at a door of the elevator. The door sensor 3 detects a user entering or leaving the car. For example, the door sensor 3 outputs a signal each time entering or leaving of a user is detected.

The earthquake detector 4 is provided, for example, at a bottom of an elevator shaft. The earthquake detector 4 detects a tremor caused by an earthquake or the like. For example, the earthquake detector 4 outputs a signal when a tremor with a predetermined intensity or greater is detected.

The in-car button 5 is, for example, a destination-floor button, an open-door button, a close-door button, or the like provided in the car of the elevator. The hall button 6 is, for example, an upward button, a downward button, a destination-floor button, or the like provided at a hall of the elevator. The emergency button 7 is provided, for example, in the car of the elevator. When the in-car button 5, the hall button 6, or the emergency button 7 is operated by a user, a signal corresponding to the button is outputted.

For example, the signals from the weight sensor 2, the door sensor 3, the in-car button 5, and the hall button 6 are signals that can be outputted at normal time. For example, the signals from the earthquake detector 4 and the emergency button 7 are signals that can be outputted at time of emergency.

The in-car camera 8 is provided, for example, on a wall, a ceiling, or the like in the car of the elevator. For example, the in-car camera 8 always shoots an inside of the car.

The hall camera 9 is provided, for example, on a wall, a ceiling, or the like in the hall of the elevator. For example, the hall camera 9 always shoots the hall.

The elevator control section 10 is, for example, a control apparatus or the like provided in the elevator shaft, a machine room, or the like. The elevator control section 10 controls operation of the elevator. For example, the elevator control section 10 controls movement of the car, opening and closing of the door, or the like, based on the signal from the weight sensor 2, the door sensor 3, the earthquake detector 4, the in-car button 5, the hall button 6, the emergency button 7, or the like.

The in-car display 11 is provided, for example, on the wall or the like in the car of the elevator. For example, the in-car display 11 displays visual information such as a letter, an image, and the like.

The hall display 12 is provided, for example, on the wall or the like in the hall of the elevator. For example, the hall display 12 displays visual information such as a letter, an image, and the like.

The in-car speaker 13 is provided, for example, on the wall, the ceiling, or the like in the car of the elevator. For example, the in-car speaker 13 broadcasts auditory information such as a buzzer sound, an audio announcement, and the like.

The hall speaker 14 is provided, for example, on the wall, the ceiling, or the like in the hall of the elevator. For example, the hall speaker 14 broadcasts auditory information such as a buzzer sound, an audio announcement, and the like.

The monitoring image transmission apparatus 1 includes an event input section 17, an image management section 18, an image selection rule database 19, an image transmission section 20, and an image analysis result reception section 21. In the drawing, a term "database" is expressed as "DB".

The event input section 17 receives input of a signal indicating an event occurring in connection with the elevator. The event input section 17 receives, for example, output signals from the weight sensor 2, the door sensor 3, and the earthquake detector 4. The event input section 17 receives, for example, a signal indicating that the in-car button 5, the hall button 6, or the emergency button 7 is operated.

When a signal is received by the event input section 17, the image management section 18 refers to the image selection rule database 19. A preset image selection rule is stored in the image selection rule database 19.

The image management section 18 selects, as an analysis target, an image at a specific time point or during a specific time period in an image shot by at least one of the in-car camera 8 and the hall camera 9, in accordance with the image selection rule. The image to be an analysis target may be a still image or a moving image.

The image transmission section 20 transmits the image selected by the image management section 18 to the image analysis server 16 over the network 15. The image transmission section 20 does not transmit to the image analysis server 16 an image that is not selected by the image management section 18 in the images shot by the in-car camera 8 and the hall camera 9.

The image analysis server 16 recognizes a state in the car or at the hall of the elevator by analyzing the image received from the monitoring image transmission apparatus 1.

For example, the image analysis server 16 detects the number of occupants in the car, through the image analysis.

For example, the image analysis server 16 detects the number of people waiting at the hall, through the image analysis.

For example, the image analysis server 16 determines whether or not the inside of the car is in an empty state, through the image analysis.

For example, the image analysis server 16 detects an attribute of a user captured in the image, through the image analysis.

Attributes of a user include, for example, an age and a gender. An age as an attribute of a user is detected as, for example, child, adult, or elderly. Moreover, attributes of a user include, for example, with or without a wheelchair, a baby stroller, a bicycle, a dolly cart, and the like.

The image analysis server 16 transmits a result of the image analysis to the monitoring image transmission apparatus 1.

The image analysis result reception section 21 receives the result of the image analysis from the image analysis server 16. The image analysis result reception section 21 transmits the result of the image analysis to the elevator control section 10.

The elevator control section 10 controls operation of the elevator, based on the result of the image analysis.

For example, the elevator control section 10 reduces moving speed of the car and opening and closing speed of the door when the attribute of the user included in the result of the image analysis is any one of elderly and with a wheelchair or a baby stroller.

For example, the image analysis server 16 may create statistical information by user attribute from the result of the image analysis. For example, the image analysis server 16 may notify the statistical information to a manager of the elevator, an owner of the building, or the like.

For example, the image analysis result reception section 21 may transmit the result of the image analysis to at least one of the in-car display 11 and the hall display 12. For example, the in-car display 11 may display information based on the result of the image analysis. For example, the hall display 12 may display information based on the result of the image analysis.

For example, the image analysis result reception section 21 may transmit the result of the image analysis to at least one of the in-car speaker 13 and the hall speaker 14. For example, the in-car speaker 13 may broadcast an audio announcement based on the result of the image analysis. For example, the hall speaker 14 may broadcast an audio announcement based on the result of the image analysis.

For example, when the attribute of the user included in the result of the image analysis is with a wheelchair, the hall speaker 14 may announce "A wheelchair user will alight. Please clear space in front of the door." or the like.

Hereinafter, the image selection rule and operation of the image management section 18 will be described in detail.

The image selection rule is set as, for example, information indicating a specific time point with respect to a timing at which a signal is received by the event input section 17. The specific time point is, for example, a time point within 10 seconds at the latest after the signal is received by the event input section 17. When such an image selection rule is followed, the image management section 18 selects, as an analysis target, a still image obtained by cutting out a specific moment from the shot moving image.

Note that the image selection rule may be set as, for example, information indicating a plurality of time points with respect to a single timing at which a signal is received by the event input section 17. In other words, the image management section 18 may select a plurality of still images as analysis targets, for example, by cutting out a plurality of different moments from the shot moving image.

For example, information indicating a time point that is 1 second after an output signal from the door sensor 3 is received by the event input section 17 can be set as the image selection rule. In such a case, one still image capturing a state immediately after a user enters the car or immediately after a user leaves the car is selected as an analysis target.

For example, information indicating time points that are 1 second, 1.5 seconds, and 2 seconds after an output signal from the door sensor 3 is received by the event input section 17 can be set as the image selection rule. In such a case, three still images capturing states immediately after a user enters the car or immediately after a user leaves the car are selected as analysis targets.

The image selection rule may be set as, for example, information indicating a specific time period with respect to a timing at which a signal is received by the event input section 17. A starting point of the specific time period is, for example, a time point within 10 seconds at the latest after the signal is received by the event input section 17. When such an image selection rule is followed, the image management section 18 selects, as an analysis target, a moving image obtained by cutting out a specific time range from the shot moving image.

Note that the image selection rule may be set as, for example, information indicating a plurality of time periods with respect to a single timing at which a signal is received by the event input section 17. In other words, the image management section 18 may select a plurality of moving images as analysis targets, for example, by cutting out a plurality of different time ranges from the shot moving image.

According to the embodiment 1, the image management section 18 selects an image at a specific time point or during a specific time period with respect to a timing at which a signal is received by the event input section 17, in the image shot by the camera installed in at least one of the car or the hall of the elevator, in accordance with the image selection rule. The image transmission section 20 transmits the image selected by the image management section 18 to the image analysis server 16 over the network 15. Accordingly, only the image at the specific time point or during the specific time period in the shot image is transmitted to the image analysis server 16. As a result, an amount of data to be transmitted can be restrained, and the network load can be reduced. Moreover, processing load on the image analysis server can be reduced.

In the embodiment 1, for example, an image selection rule may individually be set for each type of an event. In other words, the image management section 18 may select an image, for example, in accordance with the image selection rule that varies depending on a type of an event indicated by a signal received by the event input section 17. Specifically, for example, one still image may be an analysis target in a case of an image selection rule corresponding to a signal that can be outputted at normal time, and a moving image or a plurality of still images may be analysis targets in a case of an image selection rule corresponding to a signal that can be outputted at time of emergency. Thus, an amount of data to be transmitted can be adjusted according to a degree of importance of an event, and a balance can be struck between the network load and accuracy of the image analysis.

In the embodiment 1, for example, the image management section 18 may modify the image selection rule based on a result of the image analysis performed by the image analysis server 16. For example, when an analysis result to the effect that a state in the car or at the hall cannot be recognized is received by the image analysis result reception section 21, the image management section 18 may modify the image selection rule such that the image analysis more easily results in success. Thus, lowering of accuracy of the image analysis can be prevented.

The image management section 18 may modify the image selection rule, for example, by changing a moment at which a still image to be an analysis target is cut out from the shot moving image. The image management section 18 may modify the image selection rule, for example, by enlarging a time range during which a moving image to be an analysis target is cut out from the shot moving image. The image management section 18 may modify the image selection rule, for example, by increasing the number of moments at which a plurality of still images to be analysis targets are cut out, or the number of time ranges during which a plurality of moving images are cut out, from the shot moving image. The image management section 18 may modify the image selection rule, for example, by changing an image to be an analysis target from a still image to a moving image.

Note that details of the modification of the image selection rule may be determined by the image analysis server 16. In such a case, the image selection rule database 19 may directly receive the details of the modification from the image analysis server 16 and update the image selection rule.

In the embodiment 1, for example, the image management section 18 may change image quality of an image to be selected as an analysis target, depending on a type of an event indicated by a signal received by the event input section 17. For example, when a signal that can be outputted at normal time is received by the event input section 17, the image management section 18 may make the image quality of an image to be an analysis target become standard image quality or low image quality. For example, when a signal that can be outputted at time of emergency is received by the event input section 17, the image management section 18 may make the image quality of an image to be an analysis target become high image quality. Thus, an amount of data to be transmitted can be adjusted according to a degree of importance of an event, and a balance can be struck between the network load and accuracy of the image analysis.

The image management section 18 may change the image quality of an image to be selected as an analysis target, for example, depending on a time period of day in which a signal is received by the event input section 17. For example, when the inside of the car or the hall of the elevator is designed to be exposed to sunlight, the image quality of an image to be an analysis target may relatively be lowered in daytime, and the image quality of an image to be an analysis target may relatively be raised in nighttime. Thus, a balance can be struck between the network load and accuracy of the image analysis.

In the embodiment 1, for example, the image management section 18 may determine a transmission timing, depending on a type of an event indicated by a signal received by the event input section 17. For example, the image transmission section 20 may transmit an image to the image analysis server 16 at the transmission timing determined by the image management section 18. For example, when a purpose is to collect statistical information such as user attributes, the number of occupants, or the like, an image selected as an analysis target resulting from a signal that can be outputted at normal time is not immediately transmitted, but is transmitted in a time period of day, such as nighttime, during which the network load is low, whereby concentration of loads in a specific time period of day can be restrained.

According to the embodiment 1, the event input section 17 receives, as a signal indicating an event, for example, an output signal from at least one of the weight sensor 2 and the door sensor 3 of the elevator. Accordingly, an image capturing a moment at which a user enters or leaves the car can be selected as an analysis target.

According to the embodiment 1, the event input section 17 receives, as a signal indicating an event, for example, a signal indicating that at least one of the in-car button 5 and the hall button 6 of the elevator is operated. Accordingly, an image capturing a moment at which a user makes a calling operation in the car or at the hall can be selected as an analysis target.

According to the embodiment 1, the event input section 17 receives, as a signal indicating an event, for example, a signal indicating that the emergency button 7 of the elevator is operated. Accordingly, an image capturing a moment at which a user presses the emergency button 7 in the car can be selected as an analysis target.

According to the embodiment 1, the event input section 17 receives, as a signal indicating an event, for example, an output signal from the earthquake detector 4 of the elevator. Accordingly, an image of the inside of the car or the hall at time of occurrence of an earthquake can be selected as an analysis target. When it is detected through image analysis that the inside of the car is an empty state at the time of occurrence of the earthquake, the elevator control section 10 can carry out an automatic restoration operation for the elevator.

Figure 2:
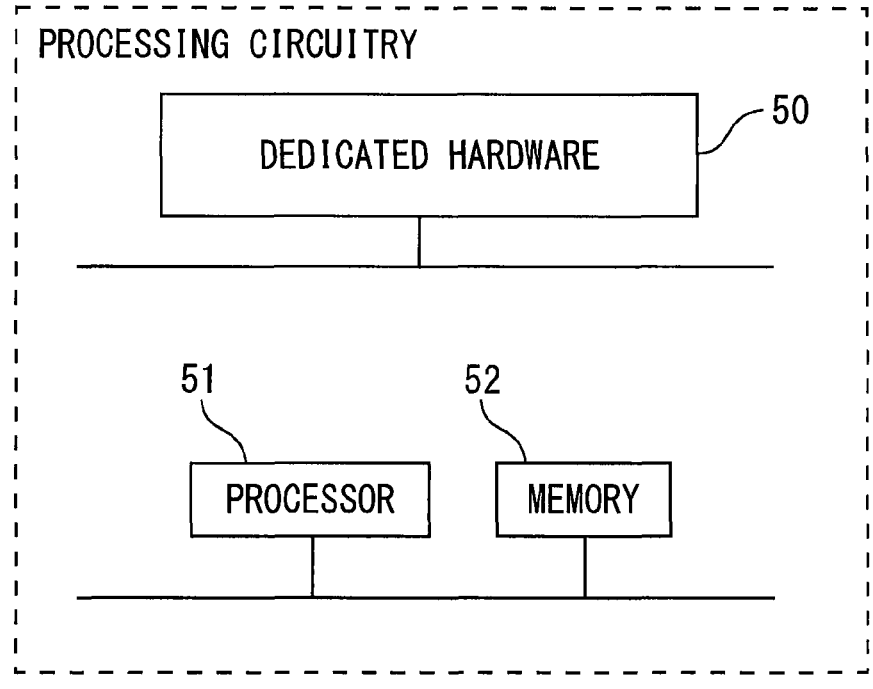
FIG. 2 is a hardware configuration diagram of a monitoring image transmission apparatus.

FIG. 2 is a hardware configuration diagram of the monitoring image transmission apparatus.

Respective functions of the event input section 17, the image management section 18, the image selection rule database 19, the image transmission section 20, and the image analysis result reception section 21 in the monitoring image transmission apparatus 1 are implemented by processing circuitry. The processing circuitry may be dedicated hardware 50. The processing circuitry may include a processor 51 and a memory 52. The processing circuitry may partially be formed as the dedicated hardware 50 and may further include the processor 51 and the memory 52. FIG. 2 shows an example in the case of the processing circuitry that is partially formed as the dedicated hardware 50 and includes the processor 51 and the memory 52.

When at least part of the processing circuitry is at least one piece of dedicated hardware 50, for example, a single circuit, a composite circuit, a programmed processor, a parallel programmed processor, an ASIC, an FPGA, or a combination of any of these corresponds to the processing circuitry.

When the processing circuitry includes at least one processor 51 and at least one memory 52, each function in the monitoring image transmission apparatus 1 is implemented by software, firmware, or a combination of the software and the firmware. The software and the firmware are described as a program and stored in the memory 52. The processor 51 implements the function of each section by reading and executing the program stored in the memory 52. The processor 51 is also referred to as CPU (Central Processing Unit), central processing apparatus, processing apparatus, arithmetic and logic unit, microprocessor, microcomputer, and DSP. For example, a non-volatile or volatile semiconductor memory such as a RAM, a ROM, a flash memory, an EPROM, or an EEPROM, a magnetic disk, a flexible disk, an optical disk, a compact disk, a mini disk, a DVD, or the like corresponds to the memory 52.

As described above, the processing circuitry can implement each function in the monitoring image transmission apparatus 1 by using hardware, software, firmware, or a combination of any of these.

INDUSTRIAL APPLICABILITY

As described hereinabove, the present invention can be used for a system in which image analysis is performed by a server connected to elevator-side devices through a network.

REFERENCE SIGNS LIST

1 Monitoring image transmission apparatus
2 Weight sensor
3 Door sensor
4 Earthquake detector
5 In-car button
6 Hall button
7 Emergency button
8 In-car camera
9 Hall camera
10 Elevator control section
11 In-car display
12 Hall display
13 In-car speaker
14 Hall speaker
15 Network
16 Image analysis server
17 Event input section
18 Image management section
19 Image selection rule database
20 Image transmission section
21 Image analysis result reception section
50 Dedicated hardware
51 Processor
52 Memory

The invention claimed is:

1. A monitoring image transmission apparatus for elevators, comprising:
   processing circuitry
   to receive input of a signal indicating an event occurring in connection with an elevator;
   to select an image at a specific time point or during a specific time period with respect to a timing at which the signal is received, in an image shot by a camera installed in at least one of a car or a hall of the elevator, in accordance with an image selection rule; and
   to transmit the image to an image analysis server over a network,
   wherein the processing circuitry is configured to modify the image selection rule based on a result of image analysis performed by the image analysis server.

2. The monitoring image transmission apparatus for elevators according to claim 1, wherein the processing circuitry does not transmit an image not selected to the image analysis server in an image always shot by the camera.

3. The monitoring image transmission apparatus for elevators according to claim 2, wherein the processing circuitry transmits the image to the image analysis server that outputs a result of an image analysis for controlling operation of the elevator.

4. The monitoring image transmission apparatus for elevators according to claim 2, wherein the specific time point or during the specific time period is after the timing at which the signal is received.

5. The monitoring image transmission apparatus for elevators according to claim 2, wherein the processing circuitry selects the image in accordance with the image selection rule that varies depending on a type of the event indicated by the signal.

6. The monitoring image transmission apparatus for elevators according to claim 2, wherein the processing circuitry changes image quality of the image to be selected depending on a type of the event indicated by the signal.

7. The monitoring image transmission apparatus for elevators according to claim 2, wherein the processing circuitry determines a transmission timing depending on a type of the event indicated by the signal, and transmits the image to the image analysis server at the transmission timing.

8. The monitoring image transmission apparatus for elevators according to claim 2, wherein the processing circuitry receives an output signal from at least one of a weight sensor and a door sensor of the elevator.

9. The monitoring image transmission apparatus for elevators according to claim 2, wherein the processing circuitry receives a signal indicating that at least one of an in-car button or a hall button of the elevator is operated.

10. The monitoring image transmission apparatus for elevators according to claim 2, wherein the processing circuitry receives a signal indicating that an emergency button of the elevator is operated.

11. The monitoring image transmission apparatus for elevators according to claim 2, wherein the processing circuitry receives an output signal from an earthquake detector of the elevator.

12. The monitoring image transmission apparatus for elevators according to claim 1, wherein the image selection rule defines a specific moment for selecting a still image from a moving image shot by the camera.

13. The monitoring image transmission apparatus for elevators according to claim 1, wherein the image selection rule defines a specific time range for selecting a moving image from a moving image shot by the camera.

14. The monitoring image transmission apparatus for elevators according to claim 1, wherein the processing circuitry selects a plurality of still images as analysis targets by cutting out a plurality of different moments from a moving image shot by the camera based on the image selection rule.

15. The monitoring image transmission apparatus for elevators according to claim 1, wherein the image selection rule is preset and stored in a database to which the processing circuitry refers.

16. The monitoring image transmission apparatus for elevators according to claim 1, wherein the specific time point defined by the image selection rule is a time point within 10 seconds after the signal is received.

17. The monitoring image transmission apparatus for elevators according to claim 1, wherein the processing circuitry modifies the image selection rule by changing a moment at which a still image to be an analysis target is cut out from a moving image shot by the camera.

\* \* \* \* \*